United States Patent
O Connor et al.

(10) Patent No.: US 6,804,587 B1
(45) Date of Patent: Oct. 12, 2004

(54) ADJUSTMENT OF VEHICLE-IMPLEMENT TRAJECTORIES TO COMPENSATE FOR LATERAL IMPLEMENT OFFSET

(75) Inventors: Michael L. O Connor, Redwood City, CA (US); Thomas Bell, Bernville, PA (US); Michael L. Eglington, Palo Alto, CA (US); Lars Leckie, Redwood City, CA (US); Gregory M. Gutt, Lexington Park, MD (US); Kurt R. Zimmerman, Mountain View, CA (US)

(73) Assignee: Integrinautics Corporation, Menlo Park, CA (US)

( * ) Notice: Subject to any disclaimer, the term of this patent is extended or adjusted under 35 U.S.C. 154(b) by 0 days.

(21) Appl. No.: 09/993,323

(22) Filed: Nov. 15, 2001

Related U.S. Application Data
(60) Provisional application No. 60/249,313, filed on Nov. 15, 2000, and provisional application No. 60/249,108, filed on Nov. 15, 2000.

(51) Int. Cl.[7] .................. G06F 19/00; G01C 21/20; G05D 1/00
(52) U.S. Cl. .................. 701/26; 701/50; 701/205; 701/207; 701/210; 701/214; 342/357.02
(58) Field of Search ................ 701/23–26, 50, 701/200–217; 342/357.01, 357.02, 357.06, 357.11, 357.13; 33/356, 361; 340/438, 988; 180/6.2, 6.24

(56) References Cited

U.S. PATENT DOCUMENTS

| | | | |
|---|---|---|---|
| 5,220,876 A | * | 6/1993 | Monson et al. ............ 111/130 |
| 5,615,116 A | | 3/1997 | Gudat et al. |
| 5,646,843 A | | 7/1997 | Gudat et al. |
| 5,657,226 A | | 8/1997 | Shin et al. |
| 5,684,696 A | | 11/1997 | Rao et al. |
| 5,752,207 A | | 5/1998 | Sarangapani |
| 5,919,242 A | * | 7/1999 | Greatline et al. ............ 701/50 |
| 5,955,973 A | * | 9/1999 | Anderson ................ 340/988 |
| 5,987,371 A | | 11/1999 | Bailey et al. |
| 5,987,383 A | | 11/1999 | Keller et al. |
| 5,994,865 A | | 11/1999 | Phelps et al. |
| 6,041,870 A | | 3/2000 | Zimmerman et al. |
| 6,052,647 A | | 4/2000 | Parkinson et al. |
| 6,062,317 A | * | 5/2000 | Gharsalli et al. ............ 172/2 |
| 6,064,926 A | | 5/2000 | Sarangapani et al. |
| 6,085,130 A | | 7/2000 | Brandt et al. |
| 6,099,236 A | | 8/2000 | Wiechman |
| 6,129,155 A | | 10/2000 | Lombardi |
| 6,173,215 B1 | | 1/2001 | Sarangapani |
| 6,185,493 B1 | | 2/2001 | Skinner et al. |
| 6,199,000 B1 | * | 3/2001 | Keller et al. ................ 701/50 |
| 6,205,381 B1 | | 3/2001 | Motz et al. |
| 6,236,916 B1 | | 5/2001 | Staub et al. |
| 6,236,924 B1 | * | 5/2001 | Motz et al. ................ 701/50 |
| 6,243,649 B1 | * | 6/2001 | Wetherbee et al. ......... 701/214 |
| 6,286,606 B1 | | 9/2001 | Krieg et al. |
| 6,295,746 B1 | | 10/2001 | Meduna et al. |
| 6,353,409 B1 | * | 3/2002 | Keller et al. .......... 342/357.17 |
| 6,463,374 B1 | * | 10/2002 | Keller et al. ................ 701/50 |

* cited by examiner

*Primary Examiner*—Thomas G. Black
*Assistant Examiner*—Ronnie Mancho
(74) *Attorney, Agent, or Firm*—Morrison & Foerster LLP (57) ABSTRACT

A system including a mobile vehicle, an implement, a position sensor, a controller, a user interface (a touch-screen monitor, video monitor or keypad, as examples), a software program to compute a calibration trajectory, and a steering system for steering the vehicle to the desired or adjusted trajectory based on the error between the vehicle's desired and actual positions. In one embodiment, non-co-located sensing and control combine with a calibration procedure to help eliminate model error. Another embodiment uses co-located sensing (but not control) to calibrate the model.

36 Claims, 5 Drawing Sheets

ADJUSTMENT OF VEHICLE-IMPLEMENT TRAJECTORIES TO COMPENSATE FOR LATERAL IMPLEMENT OFFSET

BENEFIT APPLICATIONS

This application claims the benefit of the following application:

U.S. Provisional Patent Application No. 60/249,313, entitled, "Method for the Adjustment of Vehicle-implement Trajectories to Compensate for Lateral Implement Offset," filed Nov. 15, 2000, naming Michael O'Connor and Thomas Bell as inventors, and under an obligation of assignment to IntegriNautics, Inc. of Menlo Park, Calif.

U.S. Provisional Patent Applications No. 60/249,108 is incorporated by reference herein.

The invention generally relates to operator control of autonomous heavy machinery and specifically to methods for human operators to use autonomous vehicles in agriculture, construction, and open-pit mining.

BACKGROUND

A significant amount of work has been done to improve the efficiency of heavy machinery in areas such as agriculture, construction, and open-pit mining. In particular, some efforts strive to improve effectiveness of the equipment by providing very accurate position information to the driver or even automatically steering the vehicle.

For processes that require an implement attached to the vehicle, the accuracy of the combined vehicle-implement pair may be insufficient for the overall process, even though the accuracy of the automatically controlled (or sensor-assisted) vehicle would otherwise be adequate. Prior art does not go beyond control of the vehicle to address discrepancies between the accuracy of the vehicle alone versus the accuracy of the vehicle-implement pair.

When the goal of the overall system is to accurately control the path of the implement (rather than the vehicle), there are at least two approaches that can be taken: non-co-located sensing and control, on the one hand, and co-located sensing and control, on the other.

Regarding non-co-located sensing and control, the sensor is not located on the body to be controlled. In such a system, the sensor is on the vehicle, but the object to be controlled is the implement—typically at its point of contact with the ground. The system has a very accurate model of the implement and how it is connected to the vehicle. The position of the implement is inferred from the precisely measured position of the vehicle by a transformation matrix and, possibly, a dynamic model and additional intermediary sensors at the hitch.

The advantages of this method include avoiding the additional costly sensors on the implement and avoiding the relative complexity of vehicle control in the co-located method below. A disadvantage is that this technique may not provide sufficient accuracy at the point of interest due to magnification of sensor error by inaccuracies in the model.

In a co-located sensing and control system, the sensor is located on the body to be controlled. In this case, the sensor could be a position sensor located on the implement. An advantage of this method is that the error signal used in closed-loop feedback control is directly measured at the point of interest and can be more accurate than non-co-located control. Disadvantages are that it requires additional sensors on the implement, a more elaborate controller on the vehicle, and possibly a different controller for each type of implement.

The following patents address aspects such as GPS position sensing for machine control and path planning, but do not discuss control of implements nor ways to calibrate the implement:

Parkinson et al., U.S. Pat. No. 6,052,647, "Method and System for Automatic Control of Vehicles Based on Carrier Phase Differential GPS," describes an auto control system for a land vehicle based on carrier phase differential GPS for position and heading sensing.

Gudat et al., U.S. Pat. No. 5,646,843, "Apparatus and Method for Surface Based Vehicle Control System," and Gudat et al., U.S. Pat. No. 5,615,116, "Apparatus and Method for Autonomous Vehicle Navigation Using Path Data," discuss auto control of a land vehicle with distinct operating modes and path following. Simple methods for switching between autonomous and manual modes are described.

Brandt et al., U.S. Pat. No. 6,085,130, "Method and Apparatus for Selecting a Transition Scheme for Use in Transitioning a Mobile Machine from a First Path to a Second Path" relates to the transition from one path to another path, presumably under complete autonomy.

Zimmerman et al., U.S. Pat. No. 6,041,870, "Method and Apparatus for Steering a Dozing Machine," describes actuation of a dozer blade to laterally adjust the centerline of the vehicle.

Keller et al., U.S. Pat. No. 5,987,383, "Form Line Following Guidance System," covers a method for automatically generating paths.

Rao, U.S. Pat. No. 5,684,696, "System and Method for Enabling an Autonomous Vehicle to Track a Desired Path," describes generation of a desired trajectory based on current location and desired trajectory.

Sarangapani et al., U.S. Pat. No. 6,064,926, "Method and Apparatus for Determining an Alternate Path in Response to Detection of an Obstacle," Sarangapani, U.S. Pat. No. 6,173,215, "Method for Determining a Desired Response to Detection of an Obstacle," and Sarangapani, U.S. Pat. No. 5,752,207, "Method and Apparatus for Determining a Path for a Machine between a Predetermined Route and a Final Position," all describe automatic path planning and obstacle avoidance.

Motz et al., U.S. Pat. No. 6,236,924, "System and Method for Planning the Operations of an Agricultural Machine in a Field," describes a path planning method.

The following patents pertain to vehicle control:

Motz et al., U.S. Pat. No. 6,205,381, "System and Method for Planning the Operations of an Agricultural Machine in a Field," relates to coordination of multiple vehicles under automatic control.

Staub et al., U.S. Pat. No. 6,236,916, "Autoguidance System and Method for an Agricultural Machine," relates to general auto control of farm tractors.

Gharsalli et al., U.S. Pat. No. 6,062,317, "Method and Apparatus for Controlling the Direction of Travel of an Earthworking Machine," relates to control systems for construction scraper.

Sin et al., U.S. Pat. No. 5,657,226, "System and Method for Causing an Autonomous Vehicle to Track a Path," relates to general auto control of farm tractor.

The following patents address aspects of implement control, but do not discuss ways to adjust the implement based on observed performance. These patents also deal with actuated implements only:

Gharsalli et al., U.S. Pat. No. 6,062,317, "Method and Apparatus for Controlling the Direction of Travel of an Earthworking Machine," discusses use of the implement to affect the steering on an earth-grader type of vehicle.

Gharsalli et al., U.S. Pat. No. 6,062,317, "Method and Apparatus for Controlling the Direction of Travel of an Earthworking Machine," discusses methods for planning operations of an agricultural machine in a field. Information about a work implement (a model) is provided to the system, but no provision to calibrate based on performance is discussed.

Lombardi, U.S. Pat. No. 6,129,155, "Method and Apparatus for Controlling a Work Implement Having Multiple Degrees of Freedom," Bailey et al., U.S. Pat. No. 5,987,371, "Apparatus and Method for Determining the Position of a Point on a Work Implement Attached to and Movable Relative to a Mobile Machine," Skinner et al., U.S. Pat. No. 6,185,493, "Method and Apparatus for Controlling an Implement of a Work Machine," and Wiechman, U.S. Pat. No. 6,099,236, "Apparatus for Controlling Movement of an Implement Relative to a Frame of a Work Machine," all discuss control of implements using hydraulic actuators and linear and rotary sensors to infer position. No provision to calibrate implement based on performance is discussed.

Krieg et al., U.S. Pat. No. 6,286,606, "Method and Apparatus for Controlling a Work Implement," and Meduna, et al., U.S. Pat. No. 6,295,746, "Method and Apparatus for Controlling Movement of a Work Implement," discuss changing control modes on a grader-type implement. No provision is made to calibrate the implement based on observed performance.

SUMMARY

Herein is taught a system including a mobile vehicle, an implement, a position sensor, a controller, a user interface (a touch-screen monitor, video monitor or keypad, as examples), a software program to compute a calibration trajectory, and a steering system for steering the vehicle to the desired or adjusted trajectory based on the error between the vehicle's desired and actual positions.

In one embodiment, non-co-located sensing and control combine with a calibration procedure to help eliminate model error. Another embodiment uses co-located sensing (but not control) to calibrate the model.

BRIEF DESCRIPTION OF THE DRAWINGS

FIG. #_1 illustrates a system incorporating an embodiment of the invention.

(Some of the drawings are not to scale.)

DESCRIPTION OF THE INVENTION

Figure 1:
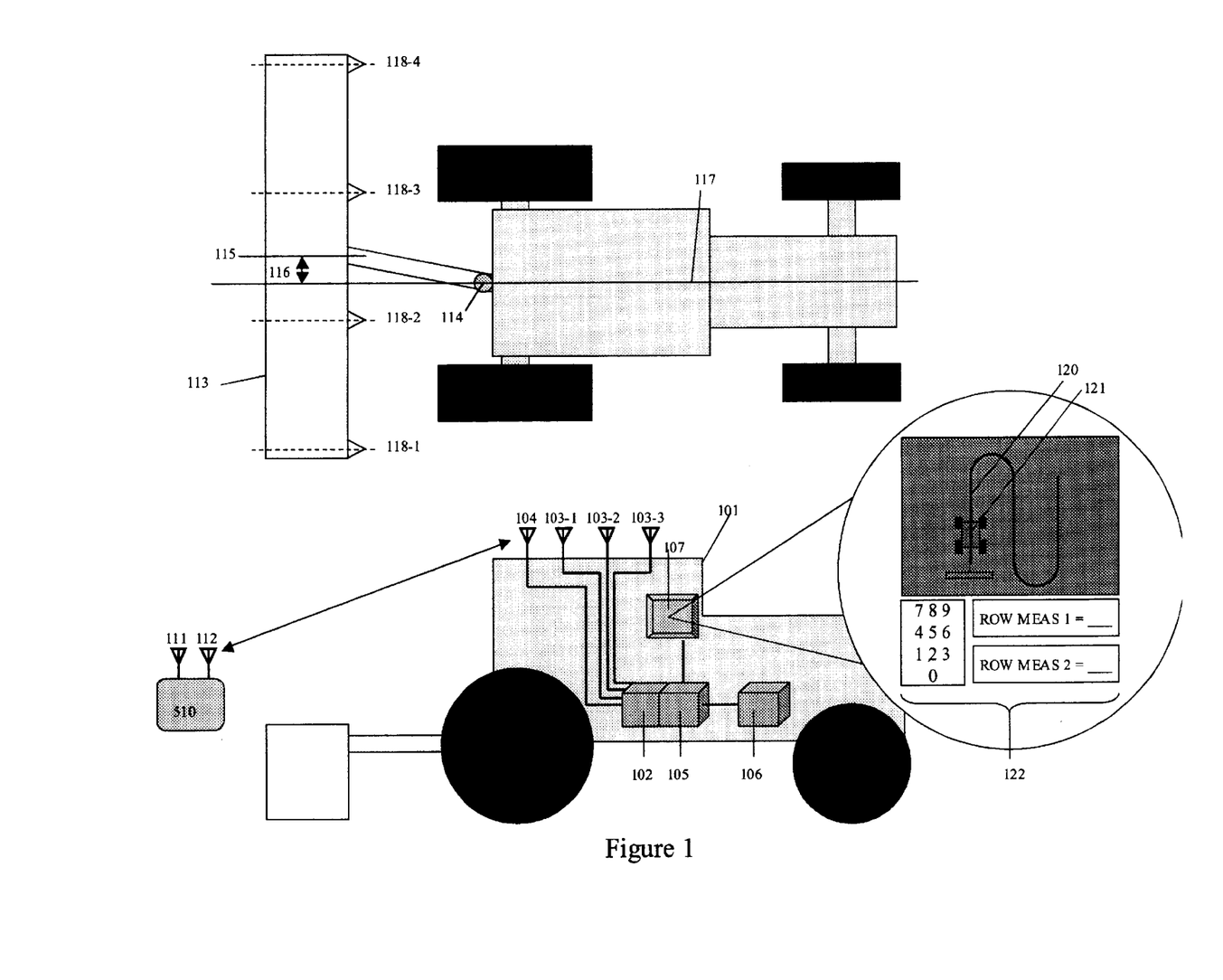

FIG. #_1 illustrates a system (1) incorporating an embodiment of the invention. The system (1) may include a farm tractor (101) and a local global positioning system (GPS) reference station (510).

The system (1) uses non-co-located sensing and control combined with a calibration procedure to eliminate model error. The accuracy of this method is limited by the accuracy of the manual measurement of row widths, described below. The system compensates for model error by adjusting the nominal trajectory of the vehicle, causing the implement to go precisely where it is intended to go.

The farm tractor (101) may have position and heading sensors (102), antennae (103-$i$), antenna (104), a controller (105), a steering system (106), a touch-screen monitor (107) and a communications link (108).

The GPS reference station (510) may include an antenna (111) and a transmitter (112).

In this example, the position and heading sensors (102) are based on the Global Positioning System (GPS). Using the local GPS reference station (510) and differential carrier phase methods, the sensors (102) sense the tractor position to inch-level accuracy. (The station (510) and the methods are well known in the art.)

The reference station (510) receives GPS signals at its location via its antenna (111) and sends them via radio modem (112) to the tractor (101) via the tractor's antenna (104). The tractor heading is measured to sub-degree accuracy using three GPS antennas (103-1:103-3), using yet another GPS technique well known in the art.

The controller (105) may be a computer that uses the GPS position and heading information to autonomously steer the tractor (101). The controller (105) generates a trajectory for the implement-offset calibration procedure. The trajectory may be a double U-turn pattern, with equal spacing between the passes, as shown by (120). The controller (105) runs software that generates a steering signal (108), which is a function of the error between the measured position and heading, on the one hand, and the desired trajectory, on the other. The steering signal (108) is applied to the vehicle's steering system (106), typically either a hydraulic actuator or another controller.

The touch-screen monitor (107) displays a graphical user interface (GUI) (109) controlled by software on the controller (105). The GUI (109) may feature icons (120, 121) representing the tractor and the desired trajectory to provide visual feedback of the system performance to the user. The graphical user interface may also feature a set of virtual buttons (122) that allow the user to enter row spacing measurements into the system.

The vehicle (101) tows or pushes an implement (113) that is attached by a hitch (114). The centerline of the implement (115) is not necessarily aligned with the centerline of the vehicle (117) due to the hitch or other model errors, creating an undesired implement offset (116). A nominal measure of the implement offset (116) may be provided by the manufacturer of the implement and entered into the system via database or hand, The implement (113) may feature equally distributed blades (118-$i$) for working the ground.

Figure 5:
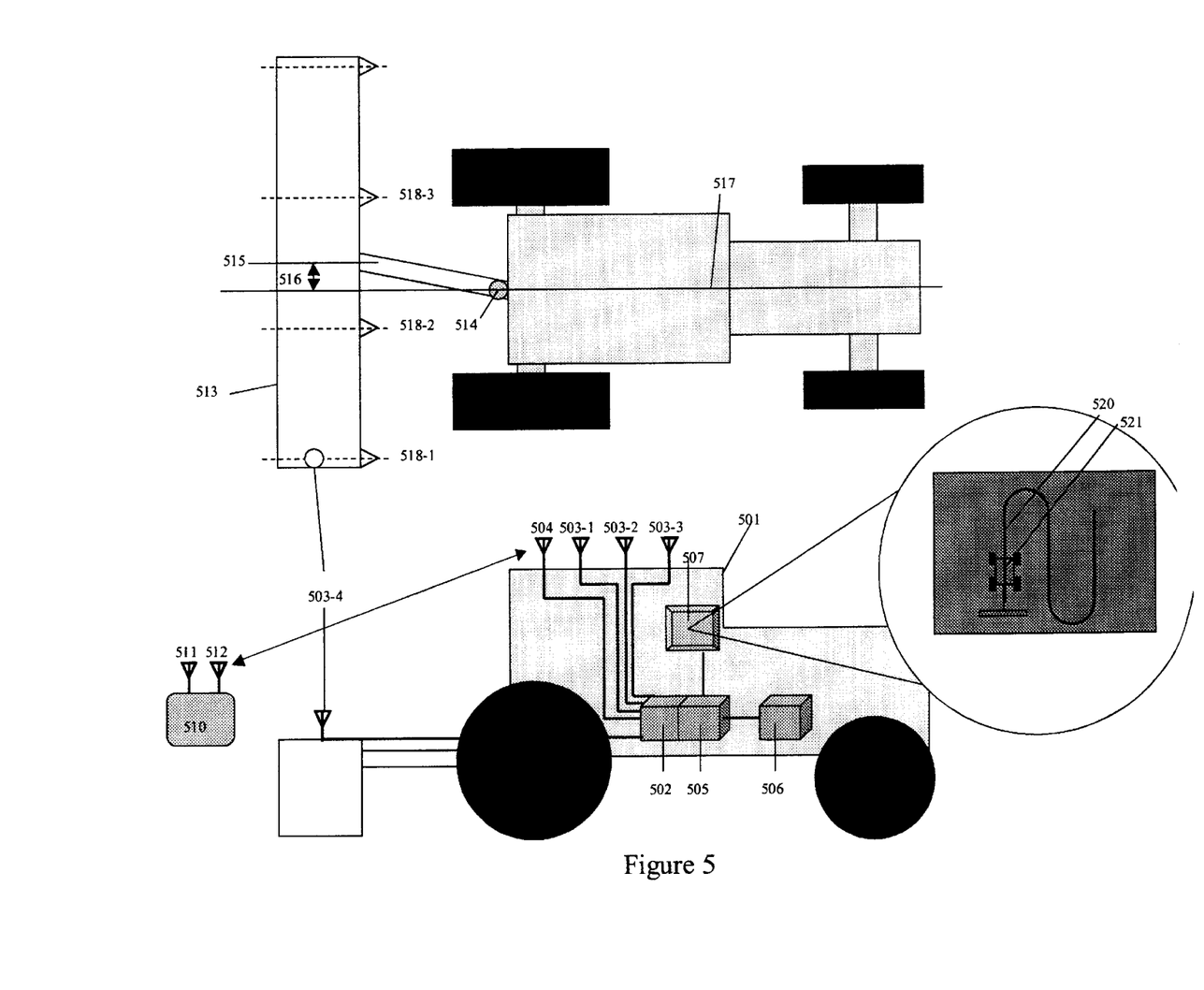
FIG. 5 illustrates another embodiment of the invention.

FIG. 5 illustrates another embodiment of the invention. This embodiment employs co-located sensing to calibrate the model, as well as non-co-located control of the vehicle-implement pair. The accuracy of the alignment of the sensor on the implement to the point of interest (one of the plowing blades, for example) limits the accuracy of this method.

This embodiment differs from the preceding embodiment in at least two ways: One, there is an extra GPS antenna (503-4) that is placed on the implement (513). Its signal is fed into the GPS sensor (502). Second, the user interface does not require a way for the user to enter measured row widths. The location of the antenna (503-4) on the implement (513) may be provided through a database or may be provided by the manufacturer of the implement (513).

Figure 2:
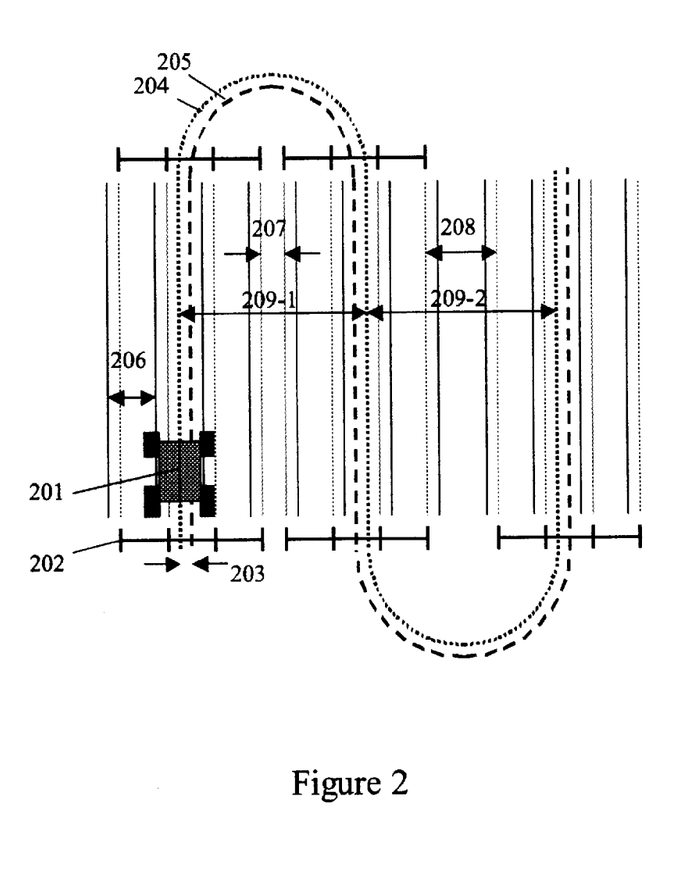
FIG. 2 illustrates a calibration trajectory.

With reference to FIG. 2, a tractor (201) tows or pushes an implement (202). The implement centerline is laterally offset from the tractor centerline by an unknown amount (203).

The tractor (201) may be commanded to follow a double U-turn trajectory (204) that is equally spaced between passes (209-i). The implement (202) forms a set of equally spaced rows (206). The pass spacing (209-i) is wider than the implement (202), so as to form intermediary rows (207, 208). The intermediary rows (207, 208) are narrower or wider than the implement-formed rows (206) due to the implement offset.

Figure 4:
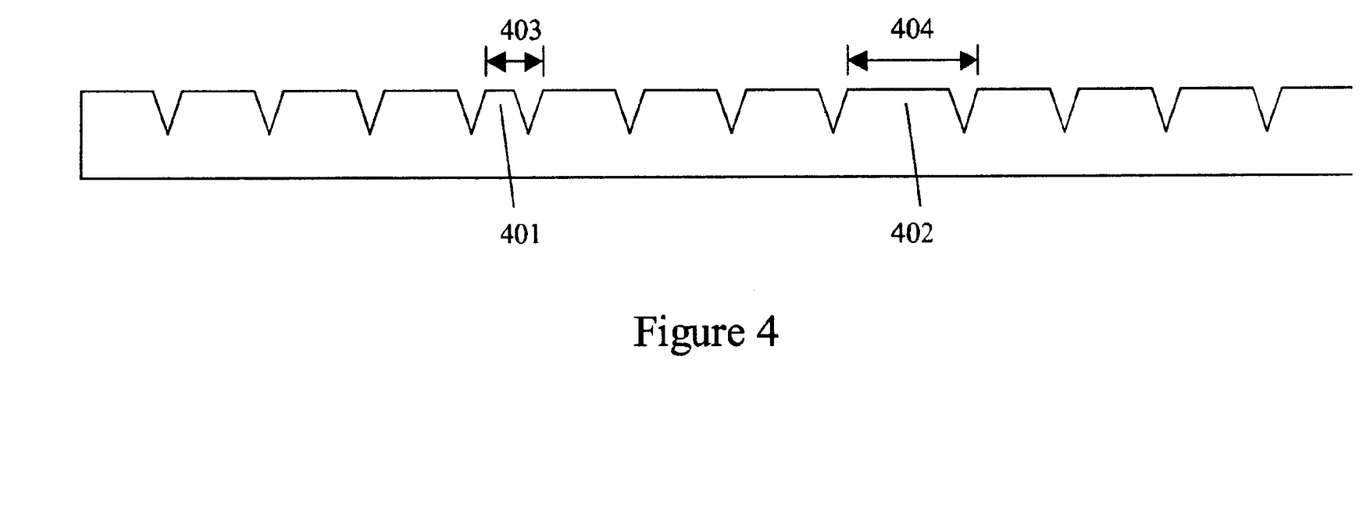
FIG. 4 illustrates intermediary rows in cross-section.

FIG. 4 illustrates the intermediary rows (401, 402) in cross-section. The width (403, 404) of an intermediary row (401, 402) is measured from top edge to top edge of an adjacent row. This may be done manually—with a tape measure, for example.

The measured distances (403, 404) are entered into the tractor's controller through the user interface as "ROW MEASUREMENT 1" and "ROW MEASUREMENT 2". The measurements are used to compute a lateral offset to be applied to future trajectories. The offset is computed as follows: The difference between the two measurements, divided by four, gives the lateral offset. The sign of the result indicates whether the offset should be applied as a left adjustment or a right adjustment.

Figure 3:
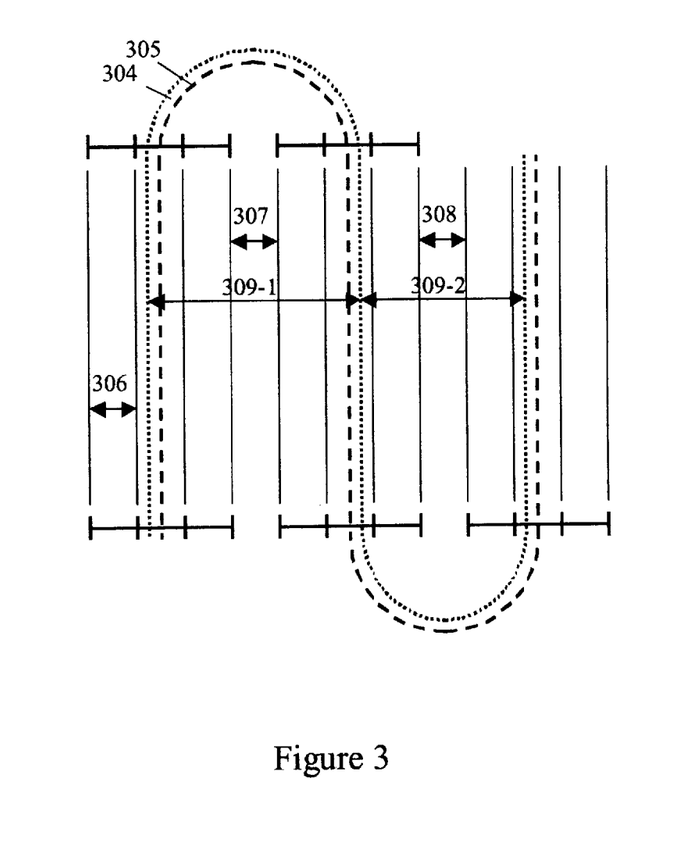
FIG. 3 illustrates a post-calibration trajectory.

The tractor may be again commanded to follow a double U-turn trajectory (304) with lateral offset applied. The spacing (309-1, 309-2) between passes may no longer be equal.

The intermediary rows (307, 308) are measured, as before. If row widths (307, 308) are not spaced to within acceptable tolerance, the procedure is repeated from the entering of measured distances into the controller.

Figure 6:
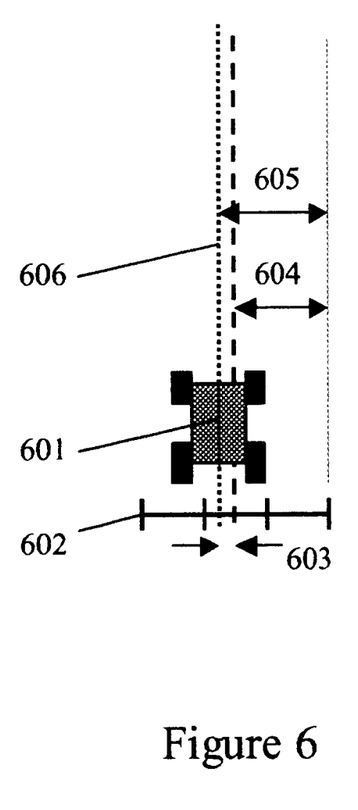
FIG. 6 illustrates yet another embodiment of the invention.

In an alternate embodiment, a tractor (601) tows or pushes an implement (602). The implement centerline is laterally offset from the tractor centerline by an unknown amount (603). The location of the implement sensor with respect to the implement centerline is accurately known (604).

The tractor may be commanded to follow a straight-line trajectory (606). The controller on the tractor collects several (e.g., more than 10) simultaneous measurements of the tractor position and the implement position as the tractor moves.

The average of the differences between the tractor positions and implement positions is calculated. The lateral component of this average (605) minus the known sensor location on the implement (604) gives the implement lateral offset (603).

The embodiments are by way of example and not limitation.

Modifications to the invention as described will be readily apparent to one of ordinary skill in the art.

What is claimed is:

1. A system to maintain the position of an implement, capable of being moved by a vehicle, over a period of time, the system comprising:
    a sensor to determine a position of the implement as a function of time;
    a controller including memory, functionally coupled to said sensor; said memory storing positional data defining a desire path and further storing program instructions executable by said controller, to compute any change in position of the implement and to compute any modification in real time to maintain said implement on said desired path; and
    means, coupled to said controller, for maintaining said implement according to said any modifications computed by said executable program;
    wherein said controller is capable or receiving a lateral offset to identify a deviation between the implement and the desired path; and
    wherein said program instructions further comprise instructions to maintain the vehicle along a vehicle path defined as a function of said lateral offset and said desired path.

2. A system to maintain the position of an implement capable of being moved by a vehicle over a period of time system comprising:
    a sensor to determine a position of the implement as a function of time;
    a controller including memory, functionally coupled to said sensor said memory storing positional data determining a desired path and further storing program instructions executable by said controller, to compute any change in position of the implement and to compute any modification in realtime to maintain said implement on said desired path; and
    means coupled to said controller for maintaining said implement according to said any modifications computed by said executable program;
    wherein said controller is capable of receiving a lateral offset to identify a deviation between the implement and the desired path; and
    further comprising means for enabling entry of a lateral offset from said desired path, whereupon said system responds to said lateral offset from said desired path and maintains the implement responsive to said lateral offset.

3. The system of claim 2, wherein said means for enabling entry of said lateral offset is useable by a user of the implement to enter said lateral offset.

4. The system of claim 2, wherein said responsive to said offset comprises directly maintaining said vehicle on a deviation path parallel to said desired path wherein a distance between said deviation path and said desired path is a function of said lateral offset.

5. The system of claim 2, wherein said lateral offset is selected from a group consisting of: a right deviation to move said deviation path to the right, and a left deviation to move said deviation path to the left.

6. The system of claim 2, wherein said memory further stores said lateral offset with respect to a location on said desired path corresponding to the position of said vehicle when said lateral offset was entered, and wherein said lateral offset stored by said memory is useable to define a new desired path.

7. A system to directly control and maintain the position of an implement, coupled to a farm vehicle on a desired predetermined path and responsive to user-determined deviation therefrom the system comprising:
    a sensor to determine a position of the implement as a function of time;
    a controller including memory, functionally coupled to said sensor; said and further storing program instructions executable by said controller, to compute any change in position of the implement and to compute any modification in realtime to maintain said implement on said desired path; and
    means, coupled to said controller for maintaining said implement according to said any modifications computed by said executable program;
    wherein said program instructions further comprise instructions to compute said any modification in realtime to maintain the vehicle along a path to maintain said implement on said desired path; and further comprising means for enabling entry of a lateral offset from said desired path, whereupon said system responds to said lateral offset from said desired path to maintain the implement responsive to said lateral offset.

8. A system to directly maintain an implement on a desired path responsive to user-determined deviation therefrom, the system comprising:

means for sensing a position of the implement as a function of time;

means for controlling a vehicle including memory, said means for controlling functionally coupled to said means for sensing, said memory storing positional data defining said desired path, and further storing program instructions; executable by said means for controlling, to compute any change in position of the implement and to compute any modifications in realtime to maintain said vehicle on said desired path responsive to any user-determined deviation;

means, coupled to said means for controlling, for maintaining the implement according to any modifications computed by said executable program; and means for enabling a user of said vehicle to input to said system said user-determined deviation from said desired path, whereupon said system responds to said user-determined deviation from said desired path and controls and maintains the implement responsive to said user-determined deviation.

9. A system to directly maintain an implement on a desired path responsive to user-determined deviation therefrom, the implement couplable to a vehicle, the system comprising:

means for determining a position of the implement as a function of the vehicle;

means for controlling the vehicle including memory; said memory storing positional data defining the desired path, and further storing program instructions, executable by said means for controlling, to compute any change in position of the implement and to compute one or more modifications in realtime to maintain said implement on the desired path responsive to any user-determined deviation, said means for controlling coupled to said means for determining;

means, coupled to said means for controlling, for maintaining the implement according to said one or more modifications computed by said executable program; and means for enabling a user of the implement to input to said system said user-determined deviation from the desired path, whereupon said system responds to said user-determined deviation from the desired path and controls and maintains the implement responsive to said user-determined deviation.

10. The system of claim 9, wherein said means for enabling a user further comprises means for enabling a user to input to said system said position of the implement as a function of the vehicle.

11. A method of guiding an implement comprising the steps of:

mechanically connecting the implement to a vehicle;

selecting a vehicle trajectory;

manually selecting offset information so as to define an implement trajectory, which is offset from the vehicle trajectory;

driving the vehicle so as to move the connected implement;

receiving satellite signals that indicate position of the vehicle during the driving step; and steering the vehicle using the received satellite signals so that the implement follows the implement trajectory during the driving step.

12. The method of claim 11, wherein manually selecting an offset information includes entry of offset information into a user interface console.

13. The method of claim 11, further including the step of:

determining an offset between the vehicle trajectory and the implement trajectory by, driving the vehicle with the connected implement along the selected vehicle trajectory; and measuring a position of one or more features formed in an area traversed by the implement during the step of driving the vehicle along the selected vehicle trajectory.

14. The method of claim 11, further including the step of:

determining an offset between the vehicle trajectory and the implement trajectory by, driving the vehicle with the connected implement within an agricultural area along the selected vehicle trajectory; and measuring a position of one or more rows formed in the agricultural area by the implement during the step of driving the vehicle along the selected vehicle trajectory.

15. The method of claim 11, wherein the offset information is predetermined.

16. The method of claim 11 further including the step of:

determining an offset between the vehicle trajectory and the implement trajectory by, driving the vehicle with the connected implement within an area along the selected vehicle trajectory; and measuring a position of one or more features formed in an area by the implement during the step of driving the vehicle along the selected vehicle trajectory;

wherein manually selecting the offset information includes entry of the one or more measured feature positions into a user interface console.

17. The method of claim 11 further including the step of:

receiving ground based signals that indicate position of the vehicle during the driving step;

wherein the steering the vehicle step steers using a combination of the received satellite signals and the received ground based signals so that the implement follows the implement trajectory during the driving step.

18. The method of claim 11, wherein the received satellite signals include GPS signals.

19. The method of claim 11, wherein the received satellite signals include GPS signals; and further including the step of:

receiving ground based local GPS signals that indicate position of the vehicle during the driving step;

wherein the steering the vehicle step steers using a combination of the received satellite signals and the received ground based signals so that the implement follows the implement trajectory during the driving step.

20. The method of claim 11, wherein an offset of the implement trajectory from the vehicle trajectory corrects for misalignment of a vehicle centerline from an implement centerline.

21. For use in guiding a vehicle mechanically connected to an implement, a system comprising:

multiple satellite position signal receivers;

user interface monitor means for manual entry of vehicle trajectory information and offset information so as to define an implement trajectory, which is offset from the vehicle trajectory;

position and heading means for using position signals received by the receivers to determine vehicle position and heading and for providing control signals; and vehicle steering control means for steering the vehicle in response to the control signals so as to cause the implement to follow the implement trajectory.

22. The system of claim 21 further including:

a ground based reference station to provide position signals to the position and heading means so as to improve accuracy of the determined vehicle position.

23. The system of claim 21, wherein the received satellite signals include GPS signals.

24. The system of claim 21, wherein the received satellite signals include GPS signals; and further including:

a ground based reference station to provide GPS signals to the position and heading means so as to improve accuracy of the determined vehicle position.

25. The system of claim 21, wherein an offset of the implement trajectory from the vehicle trajectory corrects for misalignment of a vehicle centerline from an implement centerline.

26. For use in guiding a vehicle mechanically connected to an implement, a system comprising:

multiple GPS signal receivers;

user interface monitor means for manual entry of vehicle trajectory information and offset information so as to define an implement trajectory, which is offset from the vehicle trajectory;

position and heading means for using GPS signals received by the receivers to determine vehicle position and heading and for providing control signals; and vehicle steering control means for steering the vehicle in response to the control signals so as to cause the implement to follow the implement trajectory.

27. The system of claim 26 further including:

a ground based reference station to provide GPS signals to the position and heading means so as to improve accuracy of the determined vehicle position.

28. A method of guiding an implement comprising the steps of:

mechanically connecting the implement to a vehicle;

selecting a vehicle trajectory;

driving the vehicle with the connected implement receiving satellite signals that indicate position of the vehicle during the driving step;

receiving satellite signals that indicate position of the implement during the driving step;

calculating an offset between the vehicle and the implement using the satellite signals that indicate positions of the implement and the vehicle so as to define an implement trajectory, which is offset from the vehicle trajectory; and steering the vehicle using the at least one received satellite signal so that the so that the implement follows the implement trajectory during the driving step.

29. The method of claim 28, wherein an offset of the implement trajectory from the vehicle trajectory corrects for misalignment of a vehicle centerline from an implement centerline.

30. For use in guiding a vehicle mechanically connected to an implement, a system comprising:

multiple satellite signal position signal receivers;

position control means for using position signals received by the receivers to determine an offset between the vehicle and the implement and to calculate an offset implement trajectory, which is offset from the vehicle trajectory; and vehicle steering control means for steering the vehicle so as to cause the implement to follow the implement trajectory.

31. The system of claim 30 further including:

a ground based reference station to provide position signals to the position and heading means so as to improve accuracy of the determined vehicle position.

32. The system of claim 30 further including:

wherein the received satellite signals include GPS signals.

33. The system of claim 30, wherein the received satellite signals include GPS signals; and further including:

a ground based reference station to provide GPS signals to the position and heading means so as to improve accuracy of the determined vehicle position.

34. The system of claim 30, wherein an offset of the implement trajectory from the vehicle trajectory corrects for misalignment of a vehicle centerline from an implement centerline.

35. For use in guiding a vehicle mechanically connected to an implement, a system comprising:

multiple GPS signal position signal receivers;

position control means for using GPS signals received by the receivers to determine an offset between the vehicle and the implement and to calculate an offset implement trajectory, which is offset from the vehicle trajectory; and vehicle steering control means for steering the vehicle so as to cause the implement to follow the implement trajectory.

36. The system of claim 35 further including:

a ground based reference station to provide GPS signals to the position and heading means so as to improve accuracy of the determined vehicle position.

* * * * *